Dec. 5, 1933.  M. C. DAVIES  1,938,010
NONCORRODING BATTERY TERMINAL
Filed April 27, 1931
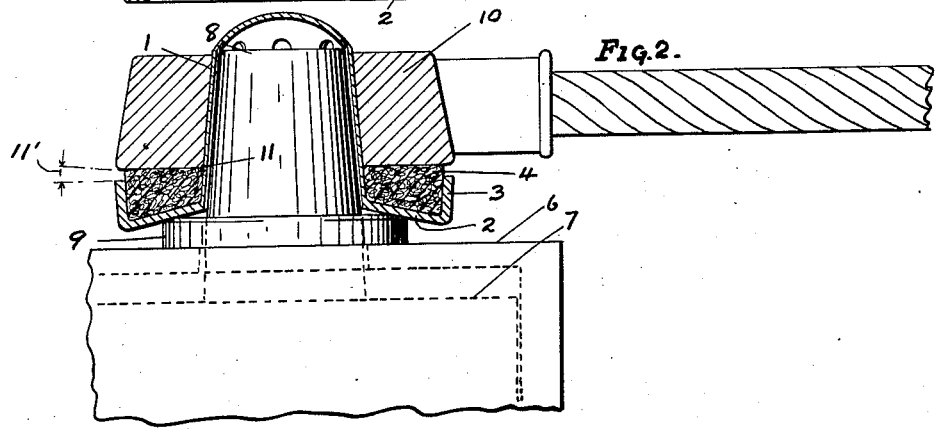
INVENTOR.
MAURICE C. DAVIES
BY
ATTORNEYS.

Patented Dec. 5, 1933

1,938,010

UNITED STATES PATENT OFFICE 1,938,010

NONCORRODING BATTERY TERMINAL

Maurice C. Davies, San Francisco, Calif.

Application April 27, 1931. Serial No. 533,074

5 Claims. (Cl. 173—259)

This invention relates to electric storage batteries of the type used on automobiles and has for its object a means to effectually prevent the corrosion of the positive terminal and the accumulation of deposits therearound which destroy the electrical connection. Another object is the provision of such a means which is cheap to manufacture, easy to apply, and will fit substantially all of the batteries used in present day automobiles without adjustment in any way, or changing their present clamp connections.

In the drawing accompanying this application Fig. 1 is a vertical section through one of my improved devices as it would appear before placing on a battery.

Fig. 2 is a vertical section of the device in position on a battery terminal and with the terminal clamp also shown in section.

Fig. 3 is a plan view of Fig. 2.

Before describing the invention it may be stated that the nuisance occasioned by the corrosion of the storage battery terminals has been recognized for a long time, and inventors have attempted to overcome the difficulty by the provision of various oil and grease-carrying cups around the terminal, but to date such devices are not in use notwithstanding the millions of batteries on automobiles subject to this nuisance. I have found the reason for this to be that the devices heretofore have required some special construction of the battery terminal, or else they have been expensive and difficult to apply, or else would not fit every battery used on the various cars, and it was particularly to overcome these deficiencies and make the device cheap and universal that I have perfected the device here shown.

The terminal post of a storage battery is of lead, round in cross section, and tapering slightly smaller toward its upper end. Generally these posts are about 11/16 of an inch in diameter at the upper end and ¾ of an inch diameter at the base, though some vary slightly either above or below these figures and one of the objects of my invention is to meet any reasonable variation of the posts with an oil-retaining cup-like device.

The drawing at Fig. 1 shows my device to be a thin slightly tapered tubular body 1 of soft lead and provided with a outwardly and downwardly sloping lower flange 2 surrounded by an upwardly projecting rim 3 forming a cup-like annular channel in which is positioned a thick soft felt washer 4.

The tubular body wall 1 is domed on top and is vertically fluted inside as at 5 the full length of the body.

The felt washer is impregnated with a mixture of light lubricating oil and petrolatum, about half and half, into which about 5 or 10 per cent of powdered sodium carbonate has been thoroughly mixed, or magnesium oxide may be used.

The tubular body 1 of my device before applying to the battery is of inwardly tapered dimensions to fit tightly upon the battery post so that it must be forced to go down over the post to the battery box.

In Fig. 2 the upper end of a battery box is designated 6, the plates inside dotted at 7, the terminal post 8 projecting through a boss 9 on the box. This view shows my device driven down tight against the boss by means of the split battery clamp 10 placed over it and hammered down.

The effect of hammering down the battery clamp drives the device 1 along with it, to stretch the tubular body to a perfect fit against the post while at the same time flattening out the tapering flange 2 down towards the boss 9, also compresses the felt washer to force the grease into the lower part of slot 5 and around the lower inner corner joint 11 of the clamp 10. But it should be noted that the terminal clamp does not come down upon the rim of the cut, as the thick felt washer maintains it spaced above it as at 11'.

The tubular portion of the device is made of thin lead so that it will stretch and conform closely to the post, and the flange 2 is also quite thin so that it will curl up inwardly to accommodate a larger post, while on the other hand, if the post is smaller than normal the flutes 5 permit closing in of the tubular portion, and the angular tipping of flange 2 as shown in Fig. 1 closes in the lower end of the tubular portion when the flange is straightened out by forcing against the boss 9 of the battery, yet maintaining at all times a continuous sleeve.

As the material of my device is lead no salts are formed between the post and the tubular portion of the device, but the two are forced into such intimate contact that they virtually become one, and the oil and grease-soaked felt effectually prevents ingress of any acid fumes to the joints in the battery clamp, though if any slight action should begin it is stopped by the neutralizing action of the soda content of the felt washer.

The space 11 between the rim 3 and clamp 10 is very important as it effectually prevents creeping of any acid film over the under side of the flange to the clamp.

The domed upper end permits closing in or stretching when the device is used on smaller or larger terminal posts.

In considering my improved battery terminal device it should be noted that it cooperates with the common bolting clamp fitting over the battery post without changes of any kind and fits all ordinary variations in battery post sizes, and as no prior device with which I am familiar has ever done this I feel entitled to claims commensurate with the advantages produced.

Having thus described my improved storage battery terminal what I claim is:—

1. A storage battery terminal device comprising a soft metal tubular body of a diameter adapted to fit over a terminal post of the battery, said tubular body being continuous and fluted down the side, provided with a flange at its lower end forming an upwardly turned channel around the body.

2. A storage battery terminal device comprising a soft metal tubular body of a diameter adapted to fit over a terminal post of the battery, said tubular body provided at its lower end with an integrally formed outwardly and downwardly extending flange having an upwardly extending outer edge of a height allowing the tubular body to extend sufficiently above it to receive a split bolting terminal clamp, whereby when the clamp is forced down upon it the flange will flatten against the battery.

3. A storage battery terminal device comprising a soft metal tubular body of a diameter adapted to fit over a terminal post of the battery, said tubular body being fluted down the side, provided with a flange at its lower end forming an upwardly turned channel around the body, and an absorbent soft washer in said channel impregnated with oily matter.

4. A storage battery terminal device comprising a soft metal tubular body of a diameter adapted to fit over a terminal post of the battery, said tubular body being fluted down the side, provided with a flange at its lower end forming an upwardly turned channel around the body, and an absorbent soft washer in said channel impregnated with oily matter and a powdered alkali.

5. A storage battery terminal device comprising a soft metal tubular body of a diameter adapted to fit over a terminal post of the battery, said tubular body provided with a flange at its lower end forming an upwardly turned channel around the body, and an absorbent soft washer in said channel impregnated with oily matter and powdered carbonate of soda.

MAURICE C. DAVIES.